United States Patent [19]

Dumbauld

[11] 3,797,774

[45] Mar. 19, 1974

[54] SEMI-AUTOMATIC BAIL STRUCTURE FOR OPEN FACE REELS

[75] Inventor: Richard Dumbauld, Oakdale, Iowa

[73] Assignee: Berkeley & Company, Inc., Spirit Lake, Iowa

[22] Filed: Aug. 7, 1972

[21] Appl. No.: 278,358

[52] U.S. Cl. .................... 242/84.2 G, 242/84.21 R
[51] Int. Cl. ............................................. A01k 89/00
[58] Field of Search .... 242/84.2 G, 84.2 F, 84.21 R

[56] References Cited
UNITED STATES PATENTS
2,832,550    4/1958    Mauborgne .................. 242/84.21 R
FOREIGN PATENTS OR APPLICATIONS
1,053,935    10/1953    France .......................... 242/84.21 R
1,119,852    7/1968    Great Britain ................. 242/84.2 G Primary Examiner—Billy S. Taylor

[57] ABSTRACT

An improved line bail structure for spinning reels wherein the line bail comprises a generally resilient semicircular arm with a certain first predetermined normal diameter, and with means for coupling the arm to the reel rotor. The bail is resiliently coupled to the rotor through a plunger element which is adapted to control the rockable rotation of the bail between open and closed dispositions. Camming means are formed along the plunger to define the stable limits for the open and closed dispositions of the bail, and with a camming ramp being secured to the reel frame to automatically rockably shift the line bail from open disposition to closed disposition upon rotation of the rotor.

10 Claims, 13 Drawing Figures

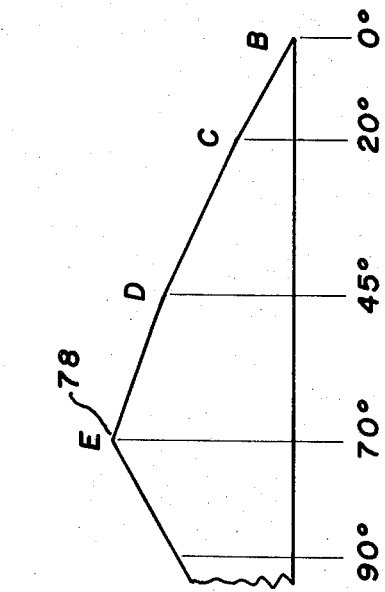
FIG.7
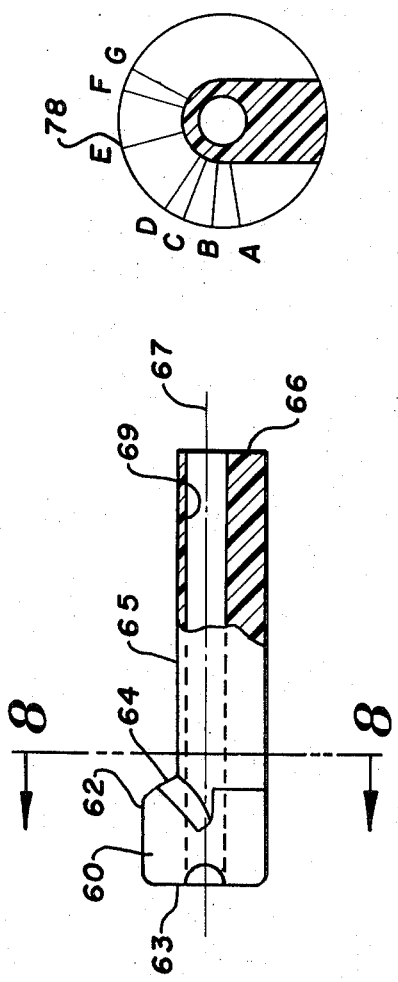
FIG.8
FIG.9
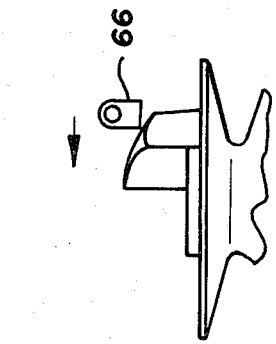
FIG.10
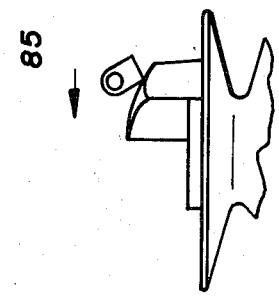
FIG.11
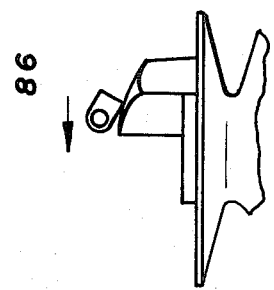
FIG.12
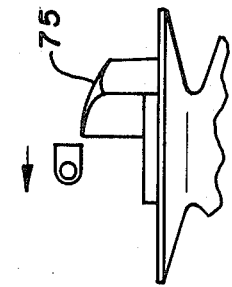
FIG.13

SEMI-AUTOMATIC BAIL STRUCTURE FOR OPEN FACE REELS

BACKGROUND OF THE INVENTION

1. The Field of the Invention

The present invention relates generally to improved fishing reel structures, and more specifically to spinning reels of the open-face type. More particularly, the present invention relates to an improved line bail assembly for an open face spinning reel wherein the line bail arm element is prepared from resilient wire material, and is mounted on the reel rotor in such a way that rotation of the rotor will cause a smooth rocking transfer or automatic shifting of the line bail from the open line casting mode to the closed line retrieval mode.

2. Description of the Prior Art

Open face spinning reels are widely used in sport fishing today. These reels normally employ a frame with a winding rotor secured to the frame, and with a line engaging bail rockable between a stable open line casting mode and a stable closed line retrieval mode. The bail is normally coupled to the rotor through a bail hinge, and a spring or other resilient member is attached between the hinge and the rotor housing, and is utilized to retain the bail in either open or closed modes. The drive mechanisms for these reels normally provide a means for automatically rocking the bail from open to closed disposition upon rotation of the rotor. The essential features of the commonly used structures render it difficult to provide smooth rocking motion between open and closed bail dispositions, and accordingly the user may experience difficulty in achieving simple, smooth, and effective closing of the bail during use. For most reels, this may occur to a greater or less extent, depending upon the immediate arcuate disposition of the rotor upon initiation of the winding operation.

In use, in the line casting mode, the bail is retracted or in opened disposition so as to free the line pay-out from the line receiving spool in response to motion imparted to the lure at the end of the line. The whipping action of the rod is utilized to impart this motion to the lure. In the line retrieval mode, the bail is normally disposed is a position so as to capture the line whereby continued rotation of the winding rotor accomplishes winding of the line onto the core of the line receiving spool. In other words, the bail is utilized to thread the incoming line over the bail, frequently over a line guide member, the bail being operatively coupled to the rotor. Thus, the bail is adapted to position the line in a axial disposition so that rotation of the bail relative to the line receiving spool will wrap the line onto the spool without requiring spool rotation. Frequently, open-face spinning reels are provided with means for reciprocating the spool axially, with the spool reciprocating means normally being coupled to the winding mechanism.

Because of the random nature of the casting operation, the final arcuate disposition of the rotor is not determined until the line retrieval operation has been completed, and hence unless the mechanism for rocking the line retrieving bail from the open casting mode to the closed retrieval mode is smooth and positive, the fisherman may experience difficulty in his initial winding of the crank and its associated mechanism after completing the pay-out of the line.

In accordance with the preferred modification of the present invention, an improved spinning reel is provided having a line bail, the arm portion of which is generally resilient and coupled directely to the rotor assembly. The bail is generally semi-circular in configuration, with the structure being provided with axially displaced inwardly directed ears which permit pivotal rotation of the line bail assembly. A plunger means is arranged to be coupled to the offsetting leg extending between the ear portion and the semi-circular arm, with the plunger being arranged to control the extent or limit of motion of the bail between open and closed dispositions. The plunger is provided with a cam surface which defines the stable end dispositions of the bail, with the plunger further being provided with associated linkage means for automatically rocking the bail from its open line casting mode to its closed line retrieval mode upon winding of the rotor. The linkage is arranged to function in a smooth, straightforward, and positive fashion, so as to substantially reduce the friction, and thus provide for smooth changeover of functional modes.

Therefore, it is a primary object of the present invention to provide improved open-face spinning reel with smooth changeover of operational modes and with smooth positive automatic changeover from open casting mode to closed line retrieving mode.

It is a further object of the present invention to provide an improved open-face spinning reel which utilizes a line bail structure with resilient arm, the bail being operatively coupled to the rotor, the line bail mechanism achieving a stable disposition for the bail arm in response to the resilient biasing available from the bail arm.

It is yet a further object of the present invention to provide an improved open-face spinning reel with a resilient semi-circular line bail arm having smoothly functioning cam linkages for automatically converting the line bail disposition from open line casting mode to closed line retrieval mode.

Other and further objects of the present invention will become apparent to those skilled in the art upon a study of the following specification, claims, and accompanying drawings.

BRIEF DESCRIPTION OF THE DRAWINGS

FIG. 7 is a side elevational view, partially broken away, of the bail receiving plunger utilized in the structure of the present invention;

FIG. 8 is a detail sectional view taken along the line and in the direction of the arrows 8—8 of FIG. 7, and illustrating the contour of the cam surface provided at the inner annular face of the plunger illustrated in FIG. 7;

FIG. 9 is a schematic illustration of the cam surface utilized in the formation of the cam area illustrated in FIG. 8; and FIGS. 10–13 are detail sectional views illustrating the motion of the plunger as it moves arcuately past the camming ramp for rocking the line bail from open line casting mode to closed line retrieval mode.

DESCRIPTION OF THE PREFERRED EMBODIMENT

Figure 1:
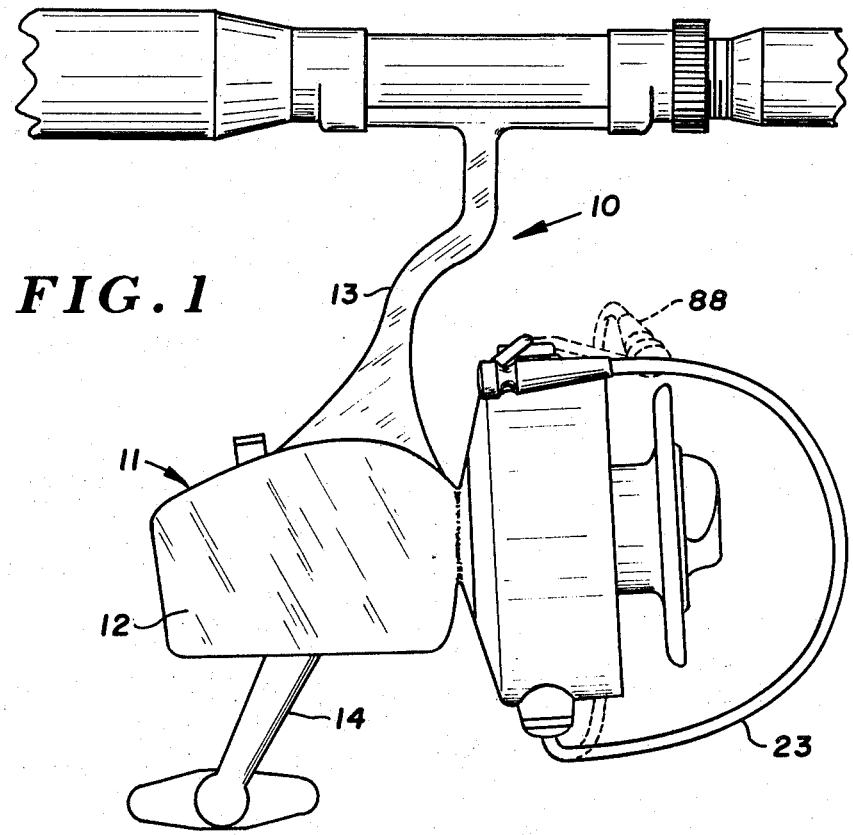
FIG. 1 is a side elevational view of a reel fabricated in accordance with the present invention, and shown mounted on a fishing rod with the forward and rear portions of the rod being broken away.
Figure 2:
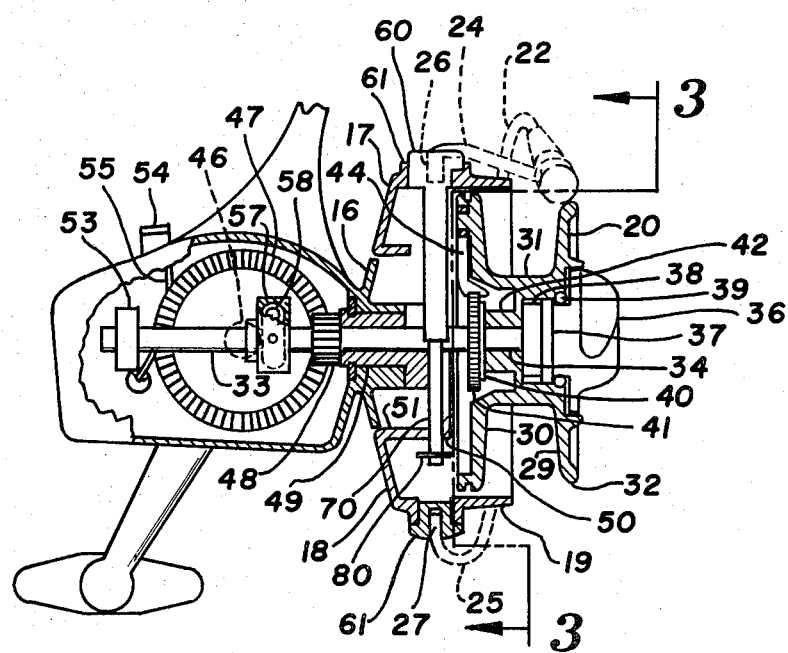
FIG. 2 is a side elevational view of the reel shown in FIG. 1, and with the rotor and line spool portions being shown in section, and with a portion of the frame housing being cut away to illustrate certain details of the winding mechanism.

With attention being directed to FIGS. 1 and 2 of the drawings, it will be observed that the spinning reel assembly generally designated 10 includes a frame means 11 with a number of components comprising the frame 11. A housing 12 is secured to mounting post 13, with winding crank 14 being coupled to the structure, as indicated. The forward portion of the frame includes a rotor core or center 16 about which rotor assembly 17 is disposed and rotated. Rotor assembly 17 includes a hollow cup-shaped housing member 18 having a forwardly extending flange portion 19 which is circumscribed about the line spool 20. A line engaging bail assembly generally designated 22 includes a generally resilient semi-circular wire arm portion 23 along with a pair of angularly directed leg portions 24 and 25 for providing axial offset for the semi-circular portion of the resilient bail. The leg portions 24 and 25 terminate in mounting ear segments 26 and 27, respectively, which, as indicated, extend generally diametrically of the semi-circular arm 23.

Line spool 20 is provided with forward and rearward flanges 29 and 30, along with a core 31. An outwardly contoured pay-out lip is also provided as at 32. The core of spool 20 is mounted upon the forward end of spindle 33, as at 34, with an adjustable drag assembly being provided for adjustably controlling the extent of resistance to rotation of the line spool 20 on spindle portion 34. The drag assembly includes a forwardly disposed drag knob 36, having a rear portion which engages drag washer 37, drag washer 37, in turn, being forced against felt washer 38. An "0" ring 39 is provided to retain drag knob 36 in its proper disposition. A spacer washer may be employed as at 40, between the forward face surface of toothed gear 41 and inner core 42 of spool 20. Clicker pick 44 is provided to audibly indicate relative rotational motion between line spool 20 and spindle 33, with the clicker pick 44 being secured to the rear flange 30 of spool 20, and engaging the individual teeth of gear 41.

Figure 3:
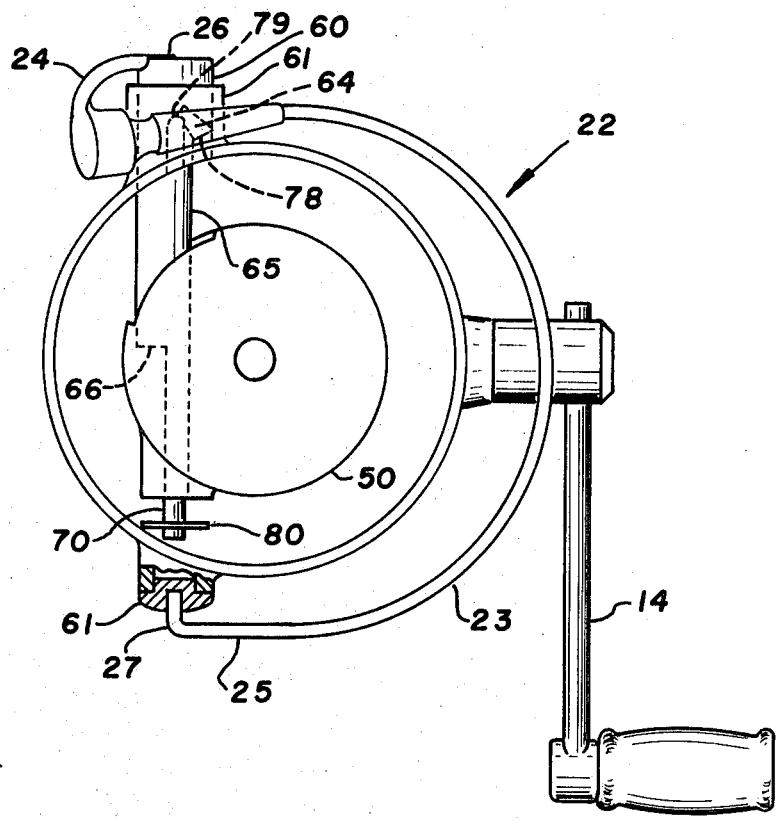
FIG. 3 is a vertical sectional view taken along the line and in the direction of the arrows 3—3 of FIG. 2.

As is conventional in spinning reels, particularly open-face spinning reels, winding crank 14 is coupled to associated mechanical linkages for causing the rotor assembly to rotate, as well as for providing the line spool mounting means to axially reciprocate. Specifically, and as indicated in FIG. 3, winding crank 14 is secured to shaft 46, with face gear 47 being fast upon shaft 46. The teeth of face gear 47 are in mesh with pinion 48, pinion 48 being, in turn, secrued to rotating sleeve 49 and coupled to rotor 18 through disk 50 and flange 51. Flange 51 is provided with bores for receiving a plunger portion of the bail assembly 22, as will be described in greater detail hereinafter.

Spindle 33 has its inner end passing through a bore formed in guide 53, with guide 53 being preferably cast integrally with the frame 11. A conventional anti-reverse notch engaging lever is illustrated at 54, with the lever achieving bi-stable positioning by virtue of leaf spring 55. The conventional slide guide 57 is utilized to couple spindle shaft 33 to eccentric post 58, with this slide guide providing the axial reciprocating motion of line spool 20 upon rotation of ring gear 47.

Detailed attention is now directed to FIGS. 2 and 3 for a description of the line bail assembly 22. As has been indicated, the line bail assembly 22 comprises a generally resilient semi-circular arm 23 with a certain first predetermined normal diameter which is less than that provided for the semi-circular arm in its mounted disposition. The line bail is operatively retained within the winding rotor by hub means 60 and 61. Hub means 60 and 61 are generally diametrically opposed and receive the ear segments 26 and 27 of bail arm 23 in bores formed therewithin. The term "diametrically opposed" as applied to the hub means is used in a comprehensive sense, since these hubs are normally offset from the diameter and define a chord through rotor 18. As is apparent in FIG. 2, angularly offset leg portion 24 of bail assembly 22 is received with a slot formed in hub 60, which, as will become apparent hereinafter, is in the form of a plunger element.

The details of plunger element 60 are illustrated in FIG. 7, and will be referred to briefly at this point. Plunger 60 which is received within rotor 18 in cup 61. includes a head portion 62 with an outer exposed surface 63 and an annular inner surface 64. Annular inner surface 64 defines a cam track as will become more apparent hereinafter. Shank portion 65 of plunger 60 extends from the annular inner surface 64, and is provided with a radially asymetric portion 66 about the central axis 67 of plunger 60. The purpose of radially asymetric portion 66 will be made more fully apparent hereinafter. It will be noted that plunger 60 is provided with a pin receiving bore 69, with a pin 60 being received therewithin (FIG. 2).

Figure 4:
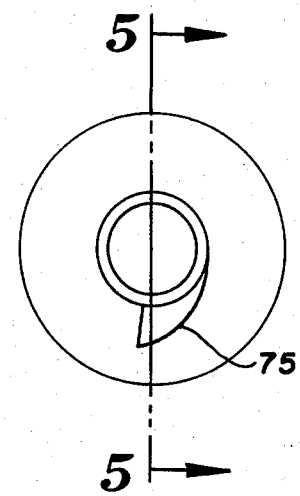
FIG. 4 is a plan view of the forward portion of the reel frame.
Figure 5:
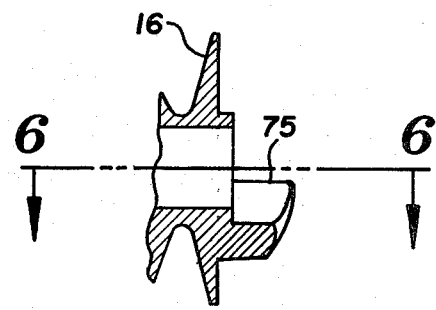
FIG. 5 is a detail vertical sectional view taken along the line and in the direction of the arrows 5—5 of FIG. 4, and illustrating the details of the camming ramp utilized to rockably rotate the line bail from line casting mode to line retrieval mode.
Figure 6:
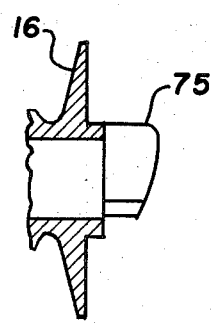
FIG. 6 is a horizontal sectional view taken along the line and in the direction of the arrows 6—6, and illustrating the camming ramp along a horizontal plane.

Particular attention is now directed to FIGS. 4, 5 and 6 which illustrate the disposition of the arcuate camming ramp which is provided at the forward end of the housing, and particularly forward of the rotor center 16. Arcuate camming ramp 75 is illustrated in FIGS. 4–6 inclusive, and is adapted to engage asymetric shank portion 66 of plunger 60. As is indicated in the drawing, arcuate camming ramp is approximately 90° in arcuate length and thus provides an elongated cam surface for smooth positive engagement with radially extending portion 66 of plunger 60. For reducing frictional forces, since arcuate camming ramp 75 is normally formed of metal, plunger 60 is preferably formed of a synthetic plastic resin material such as Delrin plastic which is an acetal resin of composition $(-OCH_2-)_n$ derived by polymerization of formaldehyde. Delrin resins are, of course, commercially available. It will be further appreciated that other durable low friction resins such as, for example, nylon, Teflon or certain polyolefins may be employed as well.

Attention is now directed to FIGS. 7, 8 and 9 which illustrate the details of plunger 60, with certain of these details having been previously discussed in connection with FIG. 7 hereinabove. As has been indicated inner annular surface 64 is effectively a cam track which provides for the extent of rocking motion of line bail 22. The profile of this cam configuration is illustrated in detail in FIGS. 8 and 9, with the center or high point being shown at 78 in FIG. 8, and referred to schematically in FIG. 9. As can be appreciated, this high-point in the cam track provides for instability, and thus the plunger and its associated mechanism will rest only at the extreme ends of the cam track. As is illustrated in FIG. 3, the plunger receiving cup is provided with a radially extending plunger supporting surface in the form of rib 79. Rib 79 is formed either rigidly or integrally with rotor 18, and its stationary disposition provides for axial inward and outward reciprocal motion of plunger 60 as the plunger carries line bail assembly 22 between open and closed stable dispositions. Also, as is illustrated in FIG. 3, the extent of outward axial travel of plunger 60 is controlled by the resilient characteristics of bail arm 23, and limited by the disposition of lock ring 80, being fast onto plunger pin 70.

Attention is now directed to FIGS. 10-13 wherein the action and motion of plunger 60 and arcuate camming ramp 75 are explained. In this connection, as the plunger approaches the camming ramp (FIG. 10) the radially asymetrical portion 66 makes initial contact and starts its rocking counterclockwise rotation. FIGS. 11 and 12 illustrate continued arcuate travel of plunger 60, along with the disposition as it continues this arcuate travel in the direction indicated by the arrows, for example, arrows 85 and 86. Upon completion of the travel of plunger 60 past ramp 75, as indicated in FIG. 13, the full extent of rockable rotation has occurred, with this rocking rotation covering a total of approximately 100 degrees of arcuate axial rotation. This extent of travel is appreciated as being substantially equivalent to the arcuate distance between the closed and open dispositions for the line bail.

In operation, therefore, the user, when desiring to initiate a cast, will open the bail assembly 22 to the disposition illustrated in FIGS. 1 and 2, and will complete his cast. Upon initial rotation of winding crank 14, rotor housing will carry plunger 60 past ramp 75 and will accordingly rock bail assembly 22 from open disposition to closed disposition. The closed disposition is illustrated in phantom in FIG. 1.

If desired, the bail arm portion 23 may carry a line guide such as illustrated at 88 in FIG. 1, it being appreciated, of course, that such guides, while desirable, are not necessary nor critical to he operation.

The apparatus of the present invention provides an inexpensive, efficient, reliable and positive bail actuating mechanism. This bail actuating mechanism is smooth-acting and provides modest additional resistance to winding motion when the bail arm is being forceably rocked from open line casting disposition to closed line retrieval disposition.

I claim:

1. In a spinning reel having frame means, a winding rotor assembly operatively to said frame means, a line engaging bail rockable between a stable open line casting mode and a stable closed line retrieval mode, means resiliently and releasably restraining said line engaging bail into either one of said stable modes, a line spool mounting means and a line spool retained thereupon, a winding crank and associated mechanical linkages for causing said winding rotor assembly to rotate and the line spool mounting means to axially reciprocate the line spool for re-winding the line;

a. said frame means including a base housing assembly having spindle means secured thereto with said spindle means being disposed generally coaxially with said rotor and with a portion of said spindle means extending generally forward of said base housing assembly for receiving said line spool thereon;

b. said line bail comprising a generally resilient semi-circular arm with a certain first pre-determined normal diameter and having angularly directed leg portions extending in a certain axial direction from each end thereof, said leg portions terminating in mounting ear segments which extend angularly from said leg portions and generally diametrically of said arm;

c. said winding rotor being arranged to operatively retain said line bail and having generally diametrically opposed first and second hub means for receiving said ear segments and for permitting pivotal rotation of said ear segments therewithin, said opposed hub means defining a second pre-determined diameter which is greater than said first pre-determined diameter for resiliently biasing said bail arm outwardly;

d. said first hub comprising a plunger received within a plunger receiving cup formed within said winding rotor, with said cup having a radially extending plunger support surface disposed adjacent the base thereof, said plunger being coupled to one of said bail legs and having a head portion with an outer surface and a generally annular inner surface and with a shank portion extending generally radially inwardly from said annular inner surface, said annular inner surface having a cam contour formed thereon and being arranged to be in resilient inwardly biased contact with said radially extending plunger support surface, said cam contour having bases defining said stable open line casting mode and said stable closed line retrieval mode, and said plunger shank portion having a radially asymetric portion formed about the central axis thereof.

2. The spinning reel as defined in claim 1 being particularly characterized in that said radially extending plunger support surface is a radially extending rib.

3. The spinning reel structure as defined in claim 1 being particularly characterized in that said base housing assembly has plunger actuating means disposed adjacent the forward end thereof, and being adapted to be engaged by said asymetric shank portion for arcuate rotation of said plunger about the cantral axis of said shank upon rotation of said winding rotor for rocking said line bail from said open line casting mode to said closed line retrieval mode.

4. The spinning reel structure as defined in claim 3 being particularly characterized in that said plunger actuating means is a generally arcuate camming ramp.

5. The spinning reel structure as defined in claim 4 being particularly characterized in that said generally arcuate camming ramp has an arcuate length of approximately 90°.

6. The spinning reel structure as defined in claim 3 being particularly characterized in that said arcuate camming ramp is disposed in axial disposition for contacting said radially asymetric plunger portion only when said line bail is disposed in open line casting disposition.

7. The spinning reel structure as defined in claim 1 being particularly characterized in that said plunger outer surface has a radially extending bail leg receiving slot formed therein.

8. The spinning reel structure as defined in claim 1 being particularly characterized in that said plunger is provided with an axially extending anchoring means secured adjacent the inner end of the plunger shank.

9. The spinning reel structure as defined in claim 1 being particularly characterized in that said plunger is fabricated of a synthetic plastic resinous material having a surface with a low coefficient of friction.

10. The spinning reel structure as defined in claim 1 being particularly characterized in that projection of said bail arm ears define a chord spaced from the diameter of said rotor.

* * * * *

UNITED STATES PATENT OFFICE
CERTIFICATE OF CORRECTION

Patent No. 3,797,774         Dated March 19, 1974

Inventor(s) Richard Dumbauld

It is certified that error appears in the above-identified patent and that said Letters Patent are hereby corrected as shown below:

Column 5, line 60, after "operatively" insert -- coupled --.

Signed and sealed this 16th day of July 1974.

(SEAL)
Attest:

McCOY M. GIBSON, JR.
Attesting Officer

C. MARSHALL DANN
Commissioner of Patents

FORM PO-1050 (10-69)